United States Patent
Rousset et al.

(10) Patent No.: US 11,673,679 B2
(45) Date of Patent: Jun. 13, 2023

(54) AIRCRAFT WITH ELECTRIC OR HYBRID PROPULSION COMPRISING A SUITABLE ELECTRICAL INSTALLATION

(71) Applicant: Airbus Operations SAS, Toulouse (FR)

(72) Inventors: David Rousset, Toulouse (FR); Jean-Marc Lacoste, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/551,970

(22) Filed: Dec. 15, 2021

(65) Prior Publication Data
US 2022/0194614 A1  Jun. 23, 2022

(30) Foreign Application Priority Data

Dec. 18, 2020  (FR) ...................................... 2013590

(51) Int. Cl.
| | | |
|---|---|---|
| *B64D 31/00* | (2006.01) | |
| *B64D 27/10* | (2006.01) | |
| *B64D 27/24* | (2006.01) | |
| *B64D 27/02* | (2006.01) | |

(52) U.S. Cl.
CPC ............. *B64D 31/00* (2013.01); *B64D 27/10* (2013.01); *B64D 27/24* (2013.01); *B64D 2027/026* (2013.01); *B64D 2221/00* (2013.01)

(58) Field of Classification Search
None
See application file for complete search history.

(56) References Cited

U.S. PATENT DOCUMENTS

| | | | |
|---|---|---|---|
| 2016/0107758 A1* | 4/2016 | Esteyne | B64D 27/24 318/139 |
| 2018/0029721 A1 | 2/2018 | Mariotto et al. | |
| 2021/0214094 A1* | 7/2021 | Harwood | H02J 3/472 |
| 2022/0081122 A1* | 3/2022 | Gazzino | B64C 27/12 |

FOREIGN PATENT DOCUMENTS

| | | |
|---|---|---|
| EP | 3276774 A1 | 1/2018 |
| FR | 3072653 A1 | 4/2019 |
| WO | 2014195246 A1 | 12/2014 |

OTHER PUBLICATIONS

French Search Report; priority document.

* cited by examiner

*Primary Examiner* — Jared Fureman
*Assistant Examiner* — Aqeel H Bukhari
(74) *Attorney, Agent, or Firm* — Greer, Burns & Crain, Ltd.

(57) ABSTRACT

An aircraft with electric or hybrid propulsion which includes an electrical installation including at least a first electrical network and at least a second electrical network operating at a voltage higher than that of the first electrical network. This second electrical network includes at least an electrical-energy distribution system, at least a reversible electric motor for aircraft propulsion directly or indirectly connected to the electrical-energy distribution system, at least a reversible electrical system directly or indirectly connected to the electrical-energy distribution system, and a safety unit positioned as close as possible to each electric motor and to each reversible electrical system.

6 Claims, 2 Drawing Sheets

AIRCRAFT WITH ELECTRIC OR HYBRID PROPULSION COMPRISING A SUITABLE ELECTRICAL INSTALLATION

CROSS-REFERENCES TO RELATED APPLICATIONS

This application claims the benefit of the French patent application No. 2013590 filed on Dec. 18, 2020, the entire disclosures of which are incorporated herein by way of reference.

FIELD OF THE INVENTION

The present application relates to an aircraft with electric or hybrid propulsion comprising a suitable electrical installation.

BACKGROUND OF THE INVENTION

An aircraft with heat engine propulsion comprises an electrical network comprising various items of electrical equipment and operating at conventional voltages, such as voltages of 115 V or of 28 V, for example.

In the case of an aircraft with electric or hybrid propulsion, this aircraft comprises electric motors for propelling the aircraft which require an electrical power supply with nonconventional high voltages in excess of 500 V, and even of the order of 3000 V. According to one embodiment visible in FIG. 1, an electrical installation 10 for an electric propulsion aircraft comprises a low-voltage first electrical network 12, substantially equivalent to the one installed in aircraft with heat engine propulsion, and a high-voltage second electrical network 14 comprising at least one electric motor 16 for propulsion as well as electrical systems for powering the electric motor 16.

According to one configuration, the electrical systems comprise batteries 18 and a turbine 18' by way of auxiliary power unit (also referred to as APU). When the aircraft is on the ground, this second electrical network 14 can be powered from an electrical power unit on the ground 20.

According to one embodiment, the electric motor 16 is reversible and produces, during certain phases of flight, electrical energy that is used notably for recharging the batteries 18.

An electrical installation for an electric or hybrid automotive vehicle readopts such an architecture comprising rechargeable batteries and reversible electric motors that use the electrical energy supplied by the batteries or that generate electrical energy which is used for recharging the batteries. In this application, the second electrical network 14 operates at a voltage of below 1500 V.

Operation at voltages higher than 1500 V, and the reduction in the dielectric properties of the air at the cruising altitude of an aircraft, lead to particular problem sets which are hitherto unresolved.

As illustrated in FIG. 2, the second electrical network 14 comprises a first power-supply busbar 22.1 at a first potential and a second power-supply busbar 22.2 at a second potential and to which busbars at least one battery 18 and the turbine 18' are connected in parallel.

For safety reasons, the electric cables 24 connecting certain electrical systems 18, 18' and the first and second power-supply busbars 22.1, 22.2 need to be routed along particular pathways in order to avoid certain critical regions of the aircraft and can thus reach a length of several meters, generally ten meters or so, in the case of the battery 18.

In flight, particularly in cruising phase, the insulating properties of the air diminish, so electrical arcing may occur and damage the electric cables 24 as well as the first and second power-supply busbars 22.1, 22.2, ultimately creating fault currents 26.

If a fault current occurs at a battery 18 and/or at one of the first or second power-supply busbars 22.1, 22.2, it is fed simultaneously by all of the sources and reversible generators connected at that time to the power-supply busbar (the battery 18 and the turbine 18'), because these are connected, in parallel, to the first and second power-supply busbars 22.1, 22.2.

When that happens, when the electric propulsion motor 16 generates electricity used to recharge the battery 18, the electrical power seen by at least one of the first or second power-supply busbars 22.1, 22.2, the electric cables 24 and/or by the electrical systems 18, 18' is of the order of a megawatt in the event of a short circuit.

Installing a long length of electric cables 24 makes it difficult, if not to say impossible, to visually inspect the entirety of the electric cables 24 in order to check their integrity and detect any installation faults.

As a result, it is necessary to protect the various elements of the electrical network 14 in case of a short circuit.

Document WO 2014/195246 relates to an electrical power-supply device for an aircraft with electric propulsion comprising two electric motors and first and second battery packs, the electrical power-supply device making it possible to limit the number of battery packs and ensure that an aircraft with electric propulsion can be propelled if one battery pack should fail.

Document EP3276774 relates to an electrical architecture of an aircraft comprising a primary three-phase electrical network powering a transformer-rectifier that allows two secondary DC electrical networks each comprising a contact switch to be powered, the contact switches being connected to one another pairwise in order to prevent them from being closed simultaneously. The second secondary network is able to power the generator-starter in order to start a heat engine.

Document FR3072653 describes an aircraft electrical network and a method for operating the electrical network aimed at implementing a configuration without the neutral of the generators being connected.

SUMMARY OF THE INVENTION

The present invention seeks to propose a novel architecture for the high-voltage electrical network so as to protect all of its elements, efficiently and automatically.

To this end, the subject of the invention is an aircraft with electric or hybrid propulsion comprising an electrical installation which comprises at least a first electrical network operating at least at a voltage suitable for an avionics system and at least a second electrical network operating at least at a voltage higher than that of the first electrical network, the second electrical network comprising at least an electrical-energy distribution system, at least a reversible electric motor for aircraft propulsion directly or indirectly connected to the electrical-energy distribution system, said electric motor being able to consume electrical energy during certain phases of flight and generate electrical energy during other phases of flight, as well as at least a reversible electrical system connected, directly or indirectly, to the electrical-energy distribution system.

According to the invention, the second electrical network comprises a safety unit for each electric motor, sitting next to the electric motor and directly connected thereto, and a safety unit for each reversible electrical system, sitting next to the electrical system and directly connected thereto, each of the safety units, connecting upstream and downstream portions of the second electrical network, being configured to interrupt, in the presence of a fault current, a flow of current between the upstream and downstream portions.

Positioning the safety units as close as possible to each electric motor and to the electrical systems allows the electrical-energy distribution system to be protected effectively, while at the same time limiting the number of safety units.

According to another feature, the reversible electrical system is an electrical-energy storage system connected to the electrical-energy distribution system by at least one electric cable, the safety unit intended for the electrical-energy storage system being interposed between the electrical-energy storage system and the electric cable connecting the electrical-energy storage system and the electrical-energy distribution system.

According to another feature, the second electrical network comprises a regulating system, a first electric cable connecting the regulating system and the electric motor, a second electric cable connecting the regulating system and the electrical-energy distribution system, a first safety unit interposed between the electric motor and the first electric cable, a second safety unit interposed between the regulating system and the second electrical cable and a third safety unit interposed between the regulating system and the first electric cable, each of the first, second and third safety units, connecting upstream and downstream portions of the second electrical network, being configured to interrupt, in the presence of a fault current, a flow of current between the upstream and downstream portions.

According to another feature, the second electrical network comprises a turbine, an electric cable connecting the turbine and the electrical-energy distribution system, and a safety unit, intended for the turbine, interposed between the turbine and the electric cable connecting the turbine and the electrical-energy distribution system, the safety unit intended for the turbine, connecting upstream and downstream portions of the second electrical network, being configured to interrupt, in the presence of a fault current, a flow of current between the upstream and downstream portions.

According to another feature, the second electrical network comprises a connecting system configured to connect an electrical power unit on the ground, an electric cable connecting the connecting system and the electrical-energy distribution system, and a safety unit, intended for the connecting system, interposed between the connecting system and the electric cable connecting the connecting system and the electrical-energy distribution system, the safety unit intended for the connecting system, connecting upstream and downstream portions of the second electrical network, being configured to interrupt, in the presence of a fault current, a flow of current between the upstream and downstream portions.

According to another feature, each safety unit comprises an actuator configured to occupy a conducting state in which it allows a current to pass between the upstream and downstream portions and a blocking state in which it does not allow a current to pass between the upstream and downstream portions, a sensor configured to measure or detect at least one characteristic of a fault current and a controller configured to control the state of the actuator according to the characteristic measured or detected by the sensor.

BRIEF DESCRIPTION OF THE DRAWINGS

Other features and advantages will become apparent from the following description of the invention, which description is given solely by way of example, with reference to the attached drawings in which.

DETAILED DESCRIPTION OF THE PREFERRED EMBODIMENTS

Figure 1:
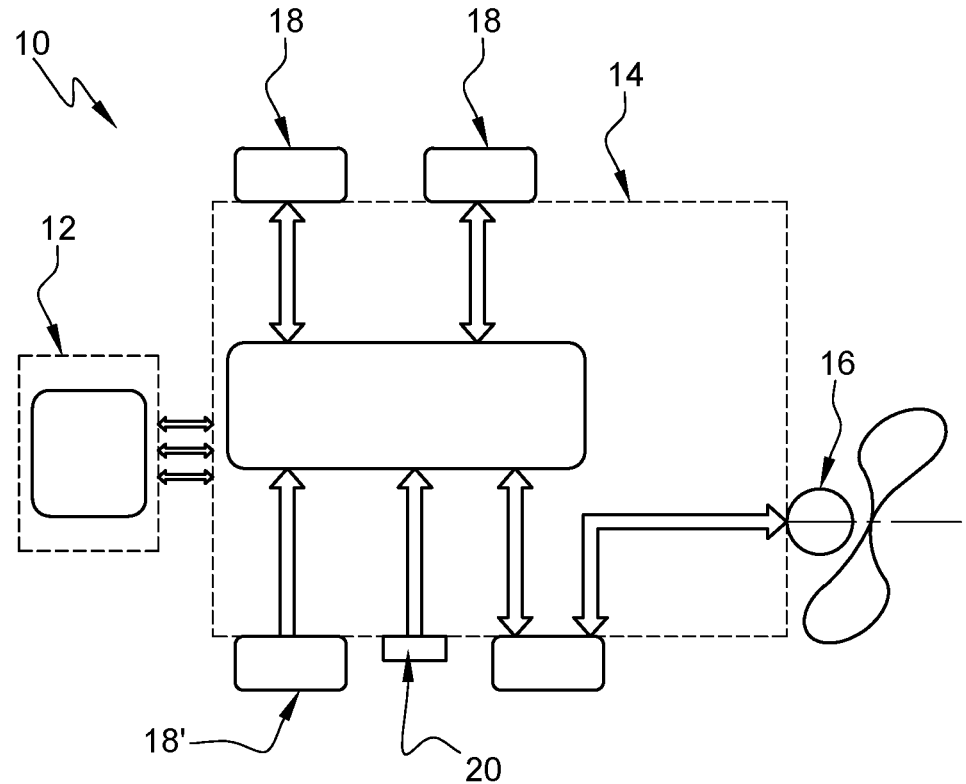
FIG. 1 is a schematic depiction of an electrical installation of an aircraft with electric propulsion illustrating an embodiment of the prior art.
Figure 2:
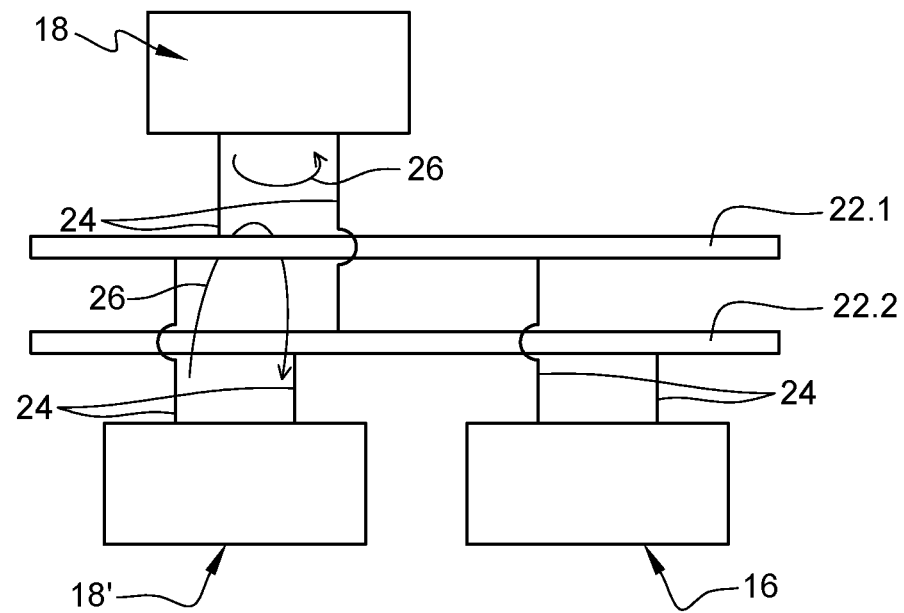
FIG. 2 is a schematic depiction of part of the electrical installation visible in FIG. 1, illustrating a short circuit.
Figure 3:
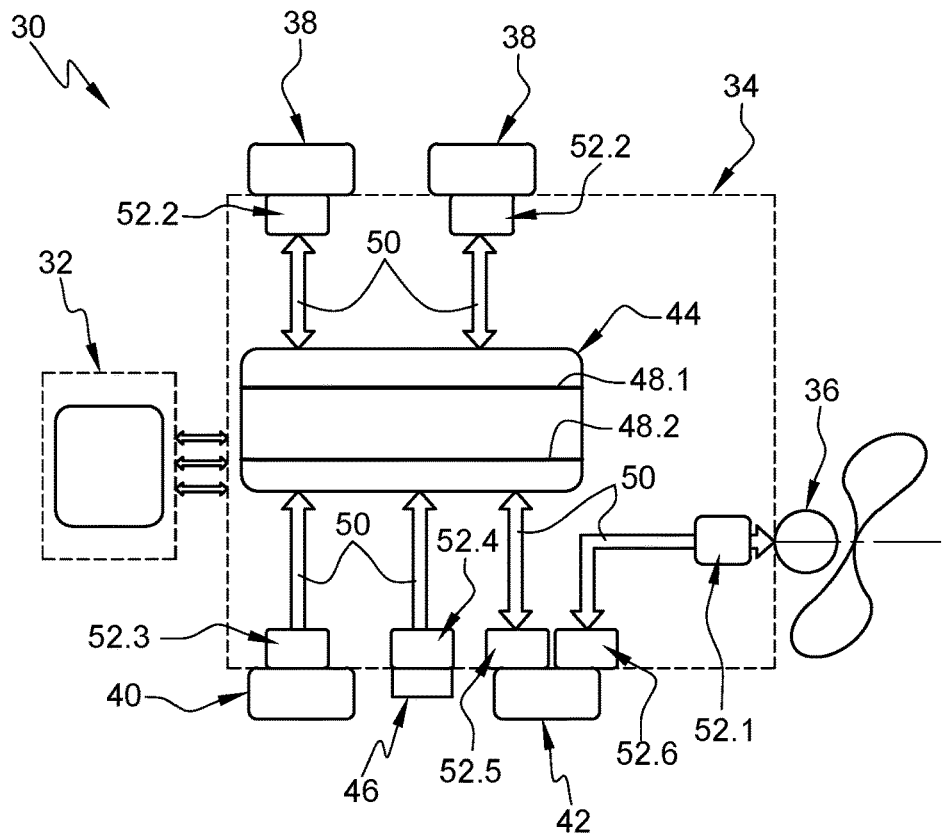
FIG. 3 is a schematic depiction of an electrical installation of an aircraft with electric or hybrid propulsion illustrating a first embodiment of the invention.
Figure 4:
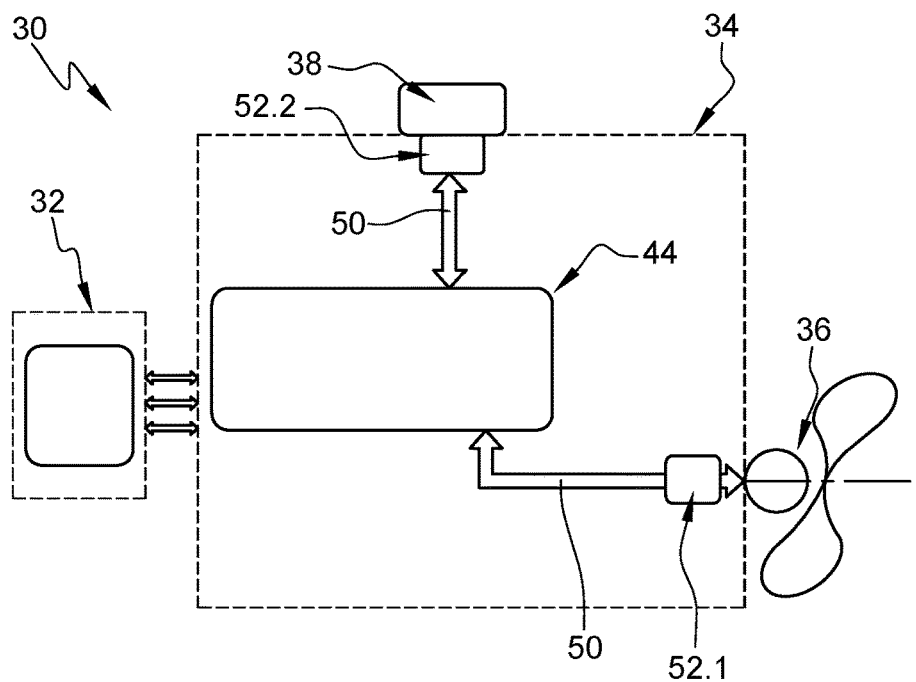
FIG. 4 is a schematic depiction of an electrical installation of an aircraft with electric or hybrid propulsion illustrating a second embodiment of the invention.

FIGS. 3 and 4 depict an electrical installation 30 of an aircraft with electric or hybrid propulsion comprising at least a first electrical network 32 operating at least at a voltage suited to an avionics system, referred to as low voltage, as well as at least a second electrical network 34 operating at least at a voltage higher than that of the first electrical network, referred to as high voltage.

The first electrical network 32 operates at conventional voltages such as voltages of the order of 115 V and/or of 28 V for example. This is not described further because it may be identical to that of the prior art.

According to one application and nonlimitingly, the second electrical network 34 is configured to operate at a voltage greater than or equal to 500 V, or even of the order of 3000 V.

According to an embodiment visible in FIG. 3, the second electrical network 34 comprises at least an electric motor 36 for the propulsion of the aircraft, at least an electrical-energy storage system 38, at least a turbine 40 configured to produce electrical energy, a regulating system 42 interposed between the electric motor 36 and at least one electrical-energy distribution system 44.

According to one configuration, the second electrical network 34 comprises a connecting system 46 for connecting an electric power unit on the ground (while the aircraft is grounded).

According to a simplified variant visible in FIG. 4, the second electrical network 34 comprises at least one electric motor 36, at least an electrical-energy storage system 38 and at least one electrical-energy distribution system 44 for connecting these.

The electric motor 36 is reversible. Thus, it alternates between constituting a load and consuming electrical energy during certain phases of flight, and constituting a source and generating electrical energy during other phases of flight.

In the same way, the electrical-energy storage system 38 is rechargeable. Thus, when the electric motor 36 is consuming electrical energy, it constitutes a source and supplies electrical energy whereas when the electric motor 36 is supplying electrical energy, it constitutes a load and stores the electrical energy.

According to one embodiment, each electrical-energy storage system 38 comprises at least one battery as well as at least one charge management system for managing the charge in the battery or batteries. As illustrated in FIG. 3, the second electrical network 34 may comprise several electrical-energy storage systems 38 themselves comprising several batteries.

According to one configuration, the turbine 40 is an auxiliary power unit, also known as an APU, configured to supply electrical energy.

The regulating system 42 is configured to regulate the electrical energy produced by the electric motor 36 and to inject it into the electrical-energy distribution system 44.

The electrical-energy distribution system 44 comprises at least two power-supply busbars 48.1, 48.2, a first power-supply busbar 48.1 at a first potential and a second power-supply busbar 48.2 at a second potential.

The electrical-energy distribution system 44 comprises electric cables 50 for connecting each electrical-energy storage system 38, the turbine 40, the regulating system 42 and the electrical connection system 46 to the first and second power-supply busbars 48.1, 48.2. The electrical-energy distribution system 44 also comprises electric cables 50 for connecting the electric motor 36 and the regulating system 42.

Whatever the embodiment, the electrical installation 30 of an aircraft comprises at least a first electrical network 32 operating at least at a voltage suited to an avionics system, generally below 500 V, and at least a second electrical network 34 operating at least at a voltage higher than that of the first electrical network, for example at a voltage greater than or equal to 1500 V, and comprising at least one electrical-energy distribution system 44, at least a reversible electric motor 36 for the aircraft propulsion connected directly or indirectly to the electrical-energy distribution system 44, and at least a reversible electrical system 38, 40, 42, 46 connected directly or indirectly to the electrical-energy distribution system 44. Thus, during certain phases of flight, a flow of electrical current circulates from the electrical system 38, 40, 42, 46 toward the electrical-energy distribution system 44 and then toward the electric motor 36 and, during certain other phases of flight, a flow of electrical current circulates from the electric motor 36 toward the electrical-energy distribution system 44 and then toward the electrical system 38, 40, 42, 46.

The electrical system 38, 40, 42, 46 may notably be an electrical-energy storage system 38, a turbine 40, a regulating system 42 or a connecting system 46. An electrical system is said to be reversible if it alternately forms a load (and consumes electrical energy) or a source (and supplies electrical energy).

Each electrical system, whether or not it is reversible, is connected to the first and second power-supply busbars 48.1, 48.2 by at least one electric cable 50. For the purposes of the present patent application, the term electric cable means a single electric cable or a harness of electric cables.

The second electrical network 34 comprises a safety unit 52.1 for each electric motor 36 and a safety unit 52.2 to 52.6 for each reversible electrical system. According to one configuration, the second electrical network 34 comprises a safety unit 52.2 to 52.6 for each electrical system, whether or not it is reversible.

Each safety unit 52.1 to 52.6 connecting upstream and downstream portions of the second electrical network 34 is configured to interrupt the flow of current between the upstream and downstream portions (whatever the direction of the flow) in the presence of a fault current, such as a short circuit current, for example.

Each safety unit 52.1 to 52.6 comprises an actuator configured to occupy a conducting state in which it allows a current to pass between the upstream and downstream portions and a blocking state in which it prevents the passage of a current between the upstream and downstream portions, a sensor configured to measure or detect at least one characteristic of a fault current and a controller configured to control the state of the actuator according to the characteristic measured or detected by the sensor.

According to one embodiment given by way of example, the sensor is configured to measure a current and the controller is configured to keep the actuator in the conducting state as long as the current measured by the sensor is below a given threshold and switch it over to the blocking state as soon as the current measured by the sensor exceeds the given threshold. Of course, the invention is not limited to that embodiment. Thus, the actuator may be a contact switch, a fuse or any other element capable of occupying conducting or blocking states and the sensor may be configured to measure a current, a voltage, a temperature or any other characteristic of a fault current.

According to one feature of the invention, the safety unit 52.1 intended for the electric motor 36 sits next to the electric motor 36 and is directly connected thereto. Thus, the safety unit 52.1 is interposed between the electric motor 36 and the electric cable 50 connecting the electric motor 36 and the regulating system 42 or the electrical-energy distribution system 44.

The safety unit 52.2 to 52.6 intended for one of the electrical systems 38, 40, 42, 46 sits next to this electrical system 38, 40, 42, 46 and is directly connected thereto. Thus, the safety unit 52.2 intended for the electrical-energy storage system 38 is interposed between the electrical-energy storage system 38 and the electric cable 50 connecting the electrical-energy storage system 38 and the electrical-energy distribution system 44. The safety unit 52.3 intended for the turbine 40 is interposed between the turbine 40 and the electric cable 50 connecting the turbine 40 and the electrical-energy distribution system 44. The safety unit 52.4 intended for the connecting system 46 is interposed between the connecting system 46 and the electric cable 50 connecting the connecting system 46 and the electrical-energy distribution system 44. Finally, the second electrical network 34 comprises a safety unit 52.5 interposed between the regulating system 42 and the cable 50 connecting the regulating system 42 and the electrical-energy distribution system 44 as well as a safety unit 52.6 interposed between the regulating system 42 and the cable 50 connecting the regulating system 42 and the electric motor 36.

Positioning the safety units 52.1 to 52.6 as close as possible to the electric motors 36 and to the electrical systems 38, 40, 42, 46 means that the electrical-energy distribution system 44, including the cables 50, can be protected effectively, while at the same time limiting the number of safety units which are no longer needed at the cables 50 and the electrical-energy distribution system 44.

This architecture offers the electrical-energy distribution system 44 protection whatever the direction in which the electrical energy is flowing. It is able to afford protection to the entirety of the cables 50 and of the electrical-energy distribution system 44.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft with electric or hybrid propulsion comprising an electrical installation which comprises
   at least a first electrical network operating at least at a voltage suitable for an avionics system and
   at least a second electrical network operating at least at a voltage higher than that of the first electrical network, the second electrical network comprising
      at least an electrical-energy distribution system,
      at least a reversible electric motor for aircraft propulsion connected directly or indirectly to the electrical-energy distribution system,
         said electric motor being able to consume electrical energy during certain phases of flight and generate electrical energy during other phases of flight,
      at least a reversible electrical system directly or indirectly connected to the electrical-energy distribution system,
   wherein the second electrical network comprises
      a safety unit for each electric motor, sitting next to the electric motor and directly connected thereto, and
      a safety unit for each reversible electrical system, sitting next to the electrical-energy distribution system and directly connected thereto,
         each of the safety units, connecting upstream and downstream portions of the second electrical network, being configured to interrupt, in a presence of a fault current, a flow of current between the upstream and downstream portions.

2. The aircraft with electric or hybrid propulsion as claimed in claim 1, wherein the reversible electrical system is an electrical-energy storage system connected to the electrical-energy distribution system by at least one electric cable, the safety unit intended for the electrical-energy storage system being interposed between the electrical-energy storage system and the electric cable connecting the electrical-energy storage system and the electrical-energy distribution system.

3. The aircraft with electric or hybrid propulsion as claimed in claim 1, wherein the second electrical network comprises
   a regulating system,
   a first electric cable connecting the regulating system and the electric motor,
   a second electric cable connecting the regulating system and the electrical-energy distribution system,
   a first safety unit interposed between the electric motor and the first electric cable,
   a second safety unit interposed between the regulating system and the second electric cable, and
   a third safety unit interposed between the regulating system and the first electric cable,
      each of the first, second and third safety units, connecting upstream and downstream portions of the second electrical network, being configured to interrupt, in the presence of a fault current, a flow of current between the upstream and downstream portions.

4. The aircraft with electric or hybrid propulsion as claimed in claim 1, wherein the second electrical network comprises
   a turbine,
   an electric cable connecting the turbine and the electrical-energy distribution system, and
   a safety unit, intended for the turbine, interposed between the turbine and the electric cable connecting the turbine and the electrical-energy distribution system, the safety unit intended for the turbine, connecting upstream and downstream portions of the second electrical network, being configured to interrupt, in the presence of a fault current, a flow of current between the upstream and downstream portions.

5. The aircraft with electric or hybrid propulsion as claimed in claim 1, wherein the second electrical network comprises
   a connecting system configured to connect an electrical power unit while the aircraft is grounded,
   an electric cable connecting the connecting system and the electrical-energy distribution system, and
   a safety unit, intended for the connecting system, interposed between the connecting system and the electric cable connecting the connecting system and the electrical-energy distribution system,
      the safety unit intended for the connecting system, connecting upstream and downstream portions of the second electrical network, being configured to interrupt, in the presence of a fault current, a flow of current between the upstream and downstream portions.

6. The aircraft with electric or hybrid propulsion as claimed in claim 1, wherein each safety unit comprises
   an actuator configured to occupy a conducting state in which it allows a current to pass between the upstream and downstream portions and a blocking state in which it does not allow a current to pass between the upstream and downstream portions,
   a sensor configured to measure or detect at least one characteristic of a fault current, and
   a controller configured to control whether the actuator is in the conducting state or the blocking state according to the characteristic measured or detected by the sensor.

* * * * *